April 12, 1966     G. M. MAST ETAL     3,245,746
PROJECTION APPARATUS AND FILM MAGAZINE THEREFOR
Filed March 13, 1962     3 Sheets-Sheet 1
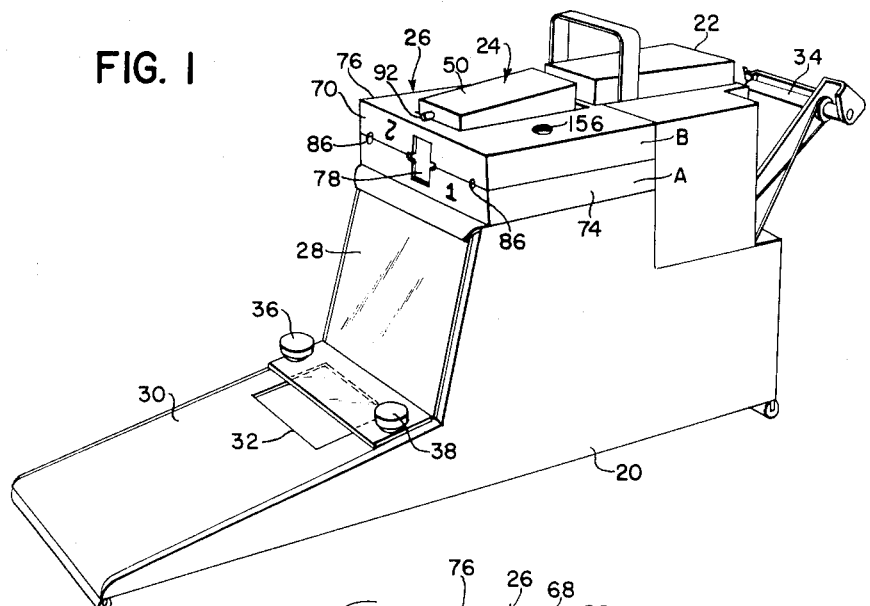
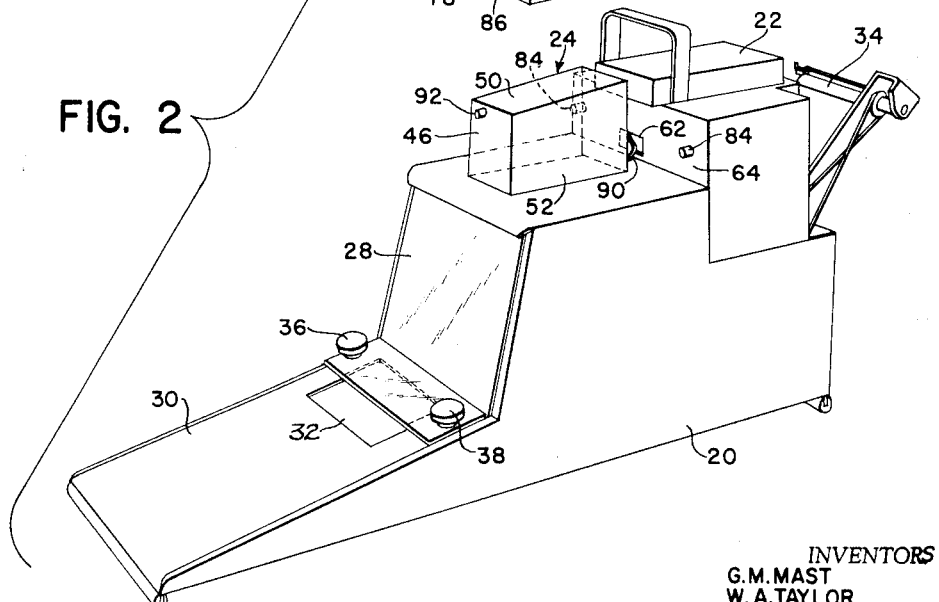
INVENTORS
G.M. MAST
W.A. TAYLOR
BY W.K. GANNETT
ATTORNEY April 12, 1966 G. M. MAST ETAL 3,245,746
PROJECTION APPARATUS AND FILM MAGAZINE THEREFOR
Filed March 13, 1962 3 Sheets-Sheet 2
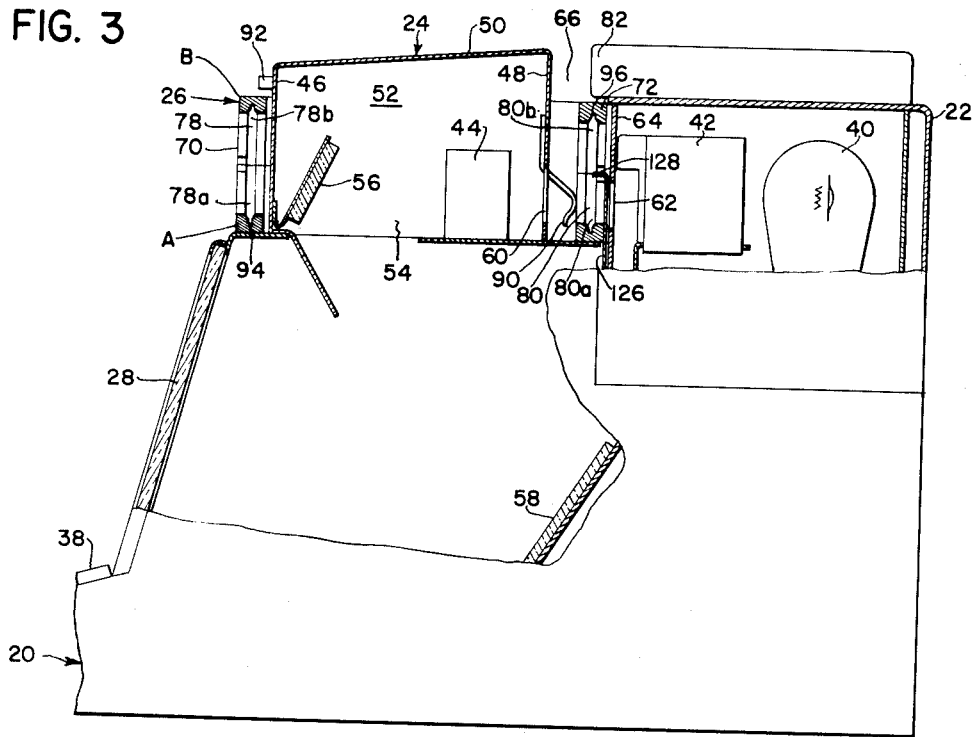
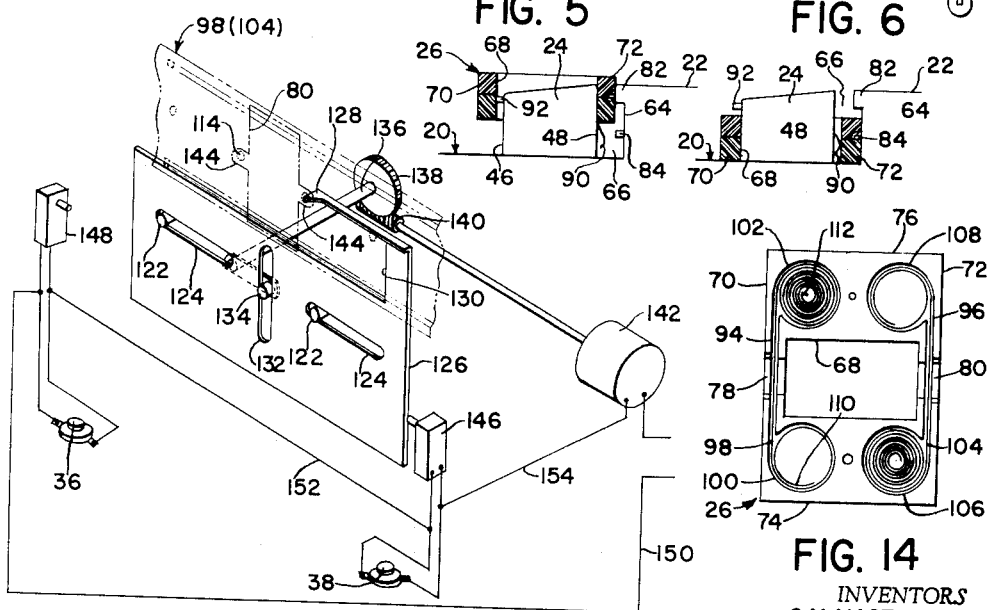
INVENTORS
G. M. MAST
W. A. TAYLOR
W. K. GANNETT
BY
ATTORNEY April 12, 1966 G. M. MAST ETAL 3,245,746
PROJECTION APPARATUS AND FILM MAGAZINE THEREFOR
Filed March 13, 1962 3 Sheets-Sheet 3
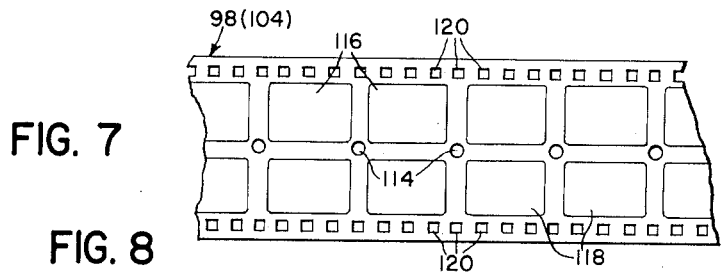
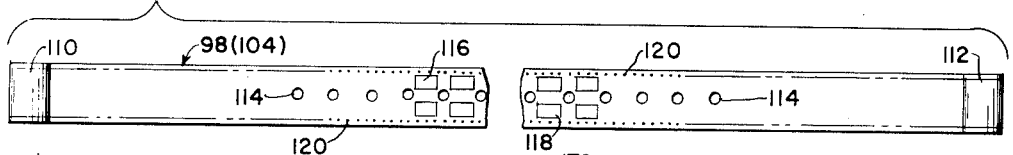
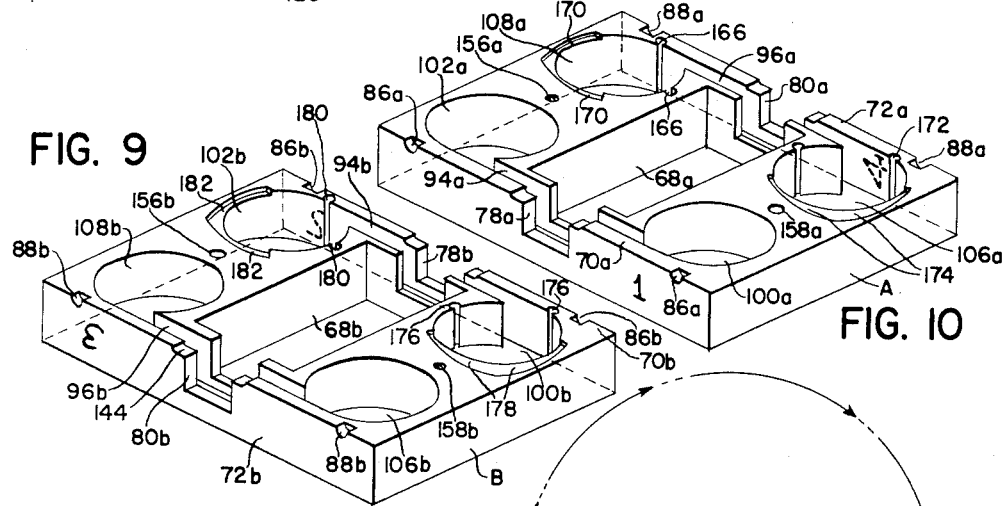
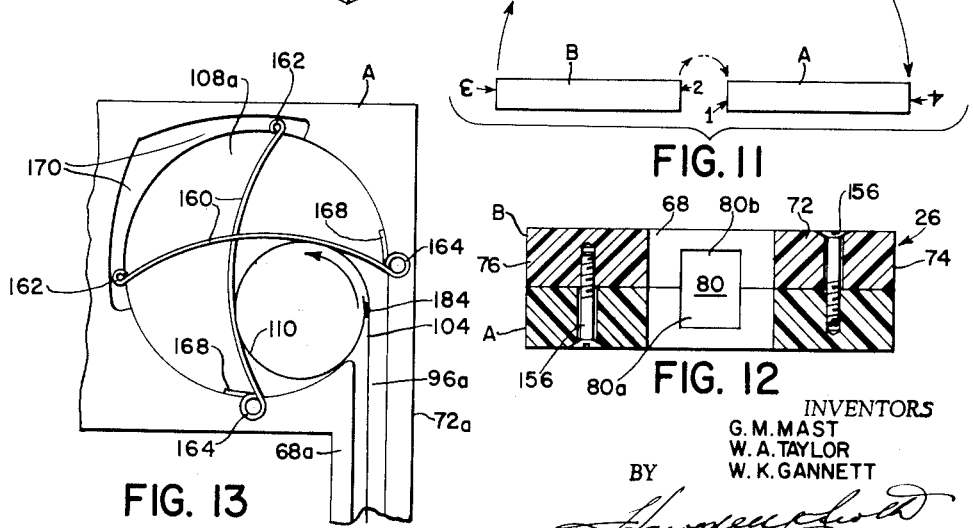
INVENTORS
G. M. MAST
W. A. TAYLOR
W. K. GANNETT
BY
ATTORNEY United States Patent Office 3,245,746
Patented Apr. 12, 1966

3,245,746
PROJECTION APPARATUS AND FILM
MAGAZINE THEREFOR
Gifford M. Mast and Wright K. Gannett, Davenport, and Wesley A. Taylor, Bettendorf, Iowa, assignors to Mast Development Co., Davenport, Iowa, a corporation of Iowa
Filed Mar. 13, 1962, Ser. No. 179,377
16 Claims. (Cl. 352—72)

This invention relates to a projection apparatus and more particularly to improvements in film handling, especially in conjunction with a novel magazine or cartridge designed to handle two or more separate films and capacitated for mounting on the projection support in a plurality of positions.

The invention finds practical utility in a teaching machine in which the film, mounted in the novel magazine or cartridge, is projected to a viewing screen by means of an optical system including a part within a mounting element on which the magazine is mountable and from which the magazine is dismountable. In this respect, it is a principal object of the invention to construct the magazine and its associated mounting element in such manner as to render it substantially fool proof so that no serious problems are presented to the user during operation. Another significant object, as related to the magazine structure resides in the provision in the magazine of dual compartments or sets of cooperating parts for handling separate films, each of which may be of the unlooped type having opposite terminal ends. A subsidiary object in this respect resides in the provision of film cavities capable of carrying the film in rolled-up condition, so that as the film is projected across the projection aperture it rolls up in the opposite cavity.

A further important object resides in the provision of a novel film designed for use with this magazine, which film has a pair of rows of frames reversely sequenced, so that the program or format on one roll of frames is viewable as the film is transported in one direction, while the program or format on the other roll of frames is excluded, but, upon inversion of the magazine, the second program is viewable to the exclusion of the first; thus, the film is rolled and unrolled from side to side in the magazine. A further object of the invention resides in constructing the magazine to carry two films of such character, thus affording a magazine that has four positions and thus is capable of presenting four programs or formats on but two films. In this regard, the invention features a film construction having a series of transport elements or perforations located centrally between the two rows of frames, which series of perforations is properly located irrespective of the inverted position of the magazine. In addition, the film is provided with the usual perforations along opposite edges so as to facilitate handling thereof in processing. The film also features terminal end portions which are free from transport perforations, thus providing adequate leader portions to assure proper installation of the film in the magazine.

The magazine construction features a pair of substantially identical halves symmetrical at opposite sides of a plane at which the two halves meet when the magazine is assembled. A still further feature of the magazine is means to assure proper rolling of the film without undue friction between portions of the film itself or between the film and the cavity in which the film rolls up.

It is another object of the invention to construct the magazine and its mounting element in such manner that the magazine is properly mountable relative to the film transport means which engages the film via the transport elements or perforations.

The foregoing and other important objects and desirable features inherent in and encompassed by the invention will become apparent as the preferred embodiment thereof is disclosed in detail in the following description and accompanying sheets of drawings, the figures of which are described below.

FIGURE 1 is a perspective view of a projection apparatus selected for purposes of illustration.

FIGURE 2 is a similar view but in an "exploded" phase, showing the relationship of the magazine to the mounting element.

FIGURE 3 is an enlarged fragmentary longitudinal section through the magazine, mounting element and optical system.

FIGURE 4 is a schematic perspective illustrating a representative form of film transport mechanism and associated electrical control.

FIGURE 5 is a schematic view illustrating one stage in the mounting or dismounting of the magazine.

FIGURE 6 illustrates the magazine in its mounted position as compared with the position of FIGURE 5.

FIGURE 7 is an enlarged fragmentary view of a portion of the film.

FIGURE 8 is a reduced view illustrating the end or leader portions of the film.

FIGURE 9 is a perspective view of one half of the magazine.

FIGURE 10 is a similar view of the other half of the magazine.

FIGURE 11 is a schematic view illustrating the relationship of the two halves before assembly.

FIGURE 12 is an enlarged section as seen generally along the line 12—12 of FIGURE 2.

FIGURE 13 is an enlarged fragmentary view of one of the film cavities in the magazine, illustrating the film control means therein.

FIGURE 14 is a schematic view illustrating the capacity of the magazine and its relationship to two separate films.

As stated above, the invention finds special utility in a teaching machine; although, obviously it will have other uses. Therefore, the illustrative material serves by way of representation and not limitation. Likewise, here, as well as in the claims, such expressions as "front," "rear," "top," "bottom," etc. are used in the interests of clarity, it being clear that the parts could be otherwise oriented.

The teaching machine chosen for purposes of illustration comprises a basic support means in the form of a housing or casing 20 having at its upper rear a subsidiary housing 22 for enclosing part of an optical system to be described later. Ahead of the housing 22 is a magazine mount or element 24, on and from which a magazine, indicated in its entirety at 26, is mountable and dismountable. As will be brought out later, the magazine carries film arranged to present one or more formats or programs which are viewable at the front of the machine via a viewing screen 28, sloping downwardly and forwardly from which is a table portion 30 having an opening 32 for exposing material, such as paper (not shown) on which the viewer or student may write. These details could, of course, be varied and since they form no part of the present invention but rather are contained in copending application, Serial No. 282,750, filed May 23, 1963, only brief reference thereto will be made here. Such paper could be in the form of that commonly used in adding machines and the like and could be unrolled from an external supporting shaft as indicated at 34 at the rear of the machine. It will be seen that the opening 32 in the table is flanked at opposite sides by buttons 36 and 38. These, as will be described subsequently, control the film transport mechanism.

As best shown in FIGURE 3, the rear housing portion 22 is in the form of a typical chimney containing part of the optical system, here a lamp 40 and a condenser 42, the remainder of the optical system, namely a projection lens 44, being contained within the mounting element 24 which itself is a box-like structure having front and rear walls 46 and 48 respectively, a top wall 50 and opposite side walls 52, all of which define a structure which has a bottom opening 54 via which light transmitted or projected along the horizontal fore-and-aft optical axis is reflected to project the image of the film to the screen 28. Hence, within the box-like element 24 is a reflector or mirror 56 which reflects the light to a mirror 58, located downwardly and rearwardly of the mirror 56. The mirror 58 in turn reflects the light forwardly to the screen 28, which, as will be seen, is downwardly from the element 24. The remaining walls of the element 24 are imperforate, with the exception of the rear wall 48 which has therein an opening or aperture 60 which is permanently in fore-and-aft register with an aperture 62 in a front wall 64 of the chimney or housing part 22. In other words, the two apertures 60 and 62 are in optical register on the optical axis, which, as explained before, is here on a fore-and-aft orientation.

The two walls 48 and 64 may be regarded as upstanding elements spaced apart fore-and-aft to define a slot 66 which opens upwardly as well as laterally to opposite sides of the element 24. The chimney may be louvered or otherwise ventilated to dissipate heat. This is not shown, because it is believed to be obvious to those versed in the art.

The magazine or cartridge 26 will first be described, for purposes of orientation and function, as though it were of one-piece construction. To this end, then, it will be observed that the magazine or cartridge chosen for purposes of illustration is a box-like body having a central mounting opening 68 defined or surrounded by a plurality of body portions, two of which are front and rear wall means 70 and 72 respectively, and two others of which are right-and left-hand side parts 74 and 76 respectively.

The front wall 70 has centrally therethrough an aperture 78 which is rectangular and vertically elongated so that its longer dimension is up and down. The rear wall 72, being symmetrically constructed, has a similar aperture 80. The relationship of the body portions surrounding the opening 68 is such as to give the opening such dimensions and shape as to be closely receivable by the mount element 24, whereby the magazine 26 is capacitated for downward mounting on and upward dismounting or removal from the element 24. As will be brought out later, the magazine is symmetrical about perpendicular intersecting axes so as to be capable of mounting on the element 24 in any one of four positions, the principles of which may be extended to secure fewer or more positions. In the example chosen for purposes of illustration, and referring now to FIGURE 3 in particular, it will be seen that the magazine, when mounted in one position, has its rear wall 72 between the two elements comprising the rear wall 48 of the element 24 and the front wall 64 of the housing portion or chimney 22. This places the lower portion of the rear wall aperture 80 in optical register with the light-transmitting aperture 62 in the front wall 64 of the chimney 22. For purposes of identification, the lower portion of the aperture 80 will be designated 80a and the upper aperture portion 80b. In this condition of the magazine, the lower portion 80a is exclusively in optical register with the light-transmitting aperture 62, the upper portion 80b being excluded. The purpose of this arrangement will be described later. On the same posture, the front wall aperture 78 has lower and upper portions 78a and 78b.

The fore-and-aft dimension of the opening 68 slightly exceeds that of the mount 24 for purposes of bringing into play coordinating parts that establish convenient and accurate mounting of the magazine on the element 24 in any of its several positions. By way of explanation, FIGURE 5 shows that when the magazine is in a preliminary stage of its mounting on the element 24, the inner face of the rear wall 72 substantially rides the rear face of the rear wall 48 of the element 24, whereas the inner face of the front wall 70 is spaced ahead of the front wall 46 of the element 24. Hence, as the magazine is moved downwardly on the element 24, the rear wall 72 thereof clears a forwardly overhanging lip 82 at the front of the chimney 22, as well as clearing a pair of dowels or locating pins 84 carried by and projecting forwardly from the front of the chimney 22. When the magazine has reached its lower most position, it is moved rearwardly so that its top passes beneath the lip 82 and the dowels or pins 84 enter openings appropriately spaced and coordinated in the rear wall 72. A pair of identically located openings appear at 86 in FIGURES 1 and 2, and from this it will be clear that similar openings exists in the rear wall, upper and lower halves of which are shown at 88a and 88b in FIGURES 9 and 10. The numerals 86a and 86b are used in FIGURES 9 and 10 to illustrate the magazine construction as respects the openings 86.

When the magazine reaches the position directly downwardly from that shown in FIGURE 5, it is urged to the rear and into locked relationship by biasing means, here in the form of a pair of curved leaf springs 90, transversely spaced so as to straddle the aperture 80, engaging the inner face of the rear wall 72 at laterally opposite sides of said aperture. Just the reverse occurs, of course, when the magazine is turned front to rear, the springs in this case engaging the interior surface of the wall 70, which now becomes the rear wall and the wall 72 becomes the front wall. In addition to the interlock established via 84–86 and 84–88, a central locating pin 92 projects forwardly from the mount 24 in overhanging relationship to whichever wall is disposed ahead of the element. When it is desired to remove the mounted magazine, it is necessary only to reverse the procedure just described; that is, the magazine is shifted forwardly against the bias of the springs 90 until all the interlocks are cleared, after which the magazine is moved straight upwardly.

The front and rear wall means 70 and 72 respectively include lengthwise thereof film tracks or guides 94 and 96 (FIGURE 14), which respectively traverse the apertures 78 and 80. The front wall 70 and the portions of the side parts 74 and 76 at the forward part of the magazine may be regarded as a group or set of three body portions designed to cooperate in the handling of a first roll of film indicated generally by the numeral 98, an intermediate portion of which runs in the film track 94 and opposite end portions of which are contained in first and second cavities 100 and 102 respectively at opposite ends of and in communication with the film track 94. In the particular illustration, the film in the cavity 102 is rolled up and the opposite end portion in the cavity 100 is beginning to be rolled up (or unrolled). A symmetrical situation exists as respects a second film 104, the intermediate portion of which is carried in the rear film track 96 and opposite end portions of which are capable of being rolled up into or unrolled out of third and fourth cavities 106 and 108 respectively at opposite ends of and in communication with the film track 96. Thus, the body portions 72 and those including the cavities 106 and 108 constitute a second set or group of body portions arranged symmetrically as respects the first group comprising the components 78, 100 and 102. These groups are separated from each other by intervening portions of the body, and, as previously noted, the front wall 46 of the mount element 24 is imperforate so that projection as respects the film 104, for example does not affect the film 98.

Reference will now be had to FIGURES 7 and 8 for a description of the special type of film used.

The film 98 (as well as the film 104, which is of course identical) is elongated and has opposite terminal ends 110 and 112, to distinguish the film from the endless or loop type. In this respect, an important feature of the invention should be noted: namely, that the film is completely confined to the magazine and has no portions extending externally thereof. In other words, the film is rolled, unrolled and transported entirely within the magazine.

The film is symmetrical about its longitudinal center line, on which in the present case there is provided a plurality or series of transport elements in the form of perforations 114 which are uniformly spaced apart lengthwise of the film, with the exception that the perforations 114 terminate short of the terminal end portions 110 and 112 for a substantial distance in each case, thus affording a relatively long leader portion at each end of the film, to insure proper installation thereof. The extent of the perforations 114 is related also to the extent, lengthwise of the film, of two rows of frames 116 and 118, one at either side of the row of center perforations 114. The central body portion in which the perforations 114 are provided separates the two rows of frames from each other, and these frames are so related to the light-transmitting apertures, previously described, as to permit viewing of one series of frames exclusively of the others. The frames are of uniform width and the perforations 114 are spaced apart uniformly on the order of one perforation per frame; that is to say, two adjacent perforations 114 include a frame between them. This, as will be brought out below, is related to the film transport mechanism by means of which the film is advanced frame by frame, one frame at a time.

It is another characteristic of the film that along opposite edge portions thereof it has the usual perforations, as at 120. Although these are not used in the transporting of the film while it is in the magazine, they facilitate processing of the film by known methods and apparatus. Also, it will be noted that the processing perforations or elements 120 may extend completely into the leader portions 110 and 112 of the film.

The transport mechanism—or a representative example thereof—is illustrated schematically in FIGURE 4, with related portions of the magazine and film illustrated in broken lines. Any suitable portion of the support means 20 may carry thereon a pair of guide pins 122 which respectively receive horizontal slots 124 in a transport member 126, which is constructed to provide a transport pawl 128 formed in the member 126 by cutting out a portion of the member as at 130 so that as the member 126 moves across the registered apertures 62–80 or 62–78, it will not cut off the light through these apertures. The length of the slots 124 and the disposition thereof is such that the member 126 can reciprocate back and forth to advance the film one frame at a time, this coordination being accomplished by a typical Scotch yoke construction including a vertical slot 132 and a crank 134 mounted at the forward end of a drive shaft 136, to the rear end of which is keyed a worm gear 138 in mesh with a worm 140 driven by the shaft from an electric motor 142, for example.

The transport mechanism is shown in its position just prior to the advance of the film through a distance equal to one frame. One-half revolution of the shaft 136 will cause the member 126 to shift to the left through a distance equal to the distance between two neighboring perforations 114. This will advance the film one frame. The aperture 80 in the magazine may be cut out at 144 to accommodate the pawl 128. The member 126 may stop in the position one frame to the left of that shown in FIGURE 4 without interfering with projection of the frame that is now exposed through the registered apertures 62 and 80a (for example). The next succeeding one-half revolution of the shaft 136 will return the member 126 to the position of FIGURE 4, the pawl ratcheting over the unperforated portion of the film until it re-engages the next succeeding perforation, following which another one-half revolution will advance the film another frame, and so on.

The foregoing may be sequenced by the provision of electrical control for the motor 142 which is tied in with the two buttons 36 and 38 which represent electrical switches, together with additional switches 146 and 148 which are controlled by being contacted by opposite ends of the member 126. This is, of course, exemplary of many constructions that could be used. In the instance shown, and with the member 126 to the right as shown in FIGURE 4, the switch 146 is open, the switch 148 is closed, and both switches controlled by the buttons 36 and 38 are open. Now, if the operator, by pressing the button 38 momentarily, closes that switch, the circuit is complete to the motor 142 via a line 150, switch 148, a line 152, closed switch at 30a and a line 154. As soon as the motor 142 starts, it drives the member 126 away from the open switch 146, which is spring-loaded to close. Hence, even though pressure on the button 38 is removed, causing that switch to open, the circuits is still complete via 150, 148, 152, 146 and 154. The motor will continue to drive to turn the shaft 136 through one-half revolution, just prior to which the member 126 will approach switch 148 and at the end of the stroke, or one-half revolution of the shaft 136, the left-hand side of the member 126 will open the switch 148, thus again breaking the circuit. To return the member 126 to the position of FIGURE 4, the switch controlled by the button 36 must be closed, and the circuit will be complete from 150, 36, 152, 146 (which closed as soon as the member 126 departed from it), 154, etc. Thus, the buttons 36 and 38 control the advance of the film, which is always unidirectional in any one position of the magazine.

The vertical dimension of each film track is of course substantially equal to the vertical or transverse dimension of the film, which is true also of the cavities 100, 102, 106 and 108. The size and shape of the light-transmitting aperture 62 at the front of the chimney 22 is substantially equal to that of a frame, and each frame is slightly less in vertical dimension than one-half of a magazine aperture 78 or 80. Stated otherwise, the vertical dimension of each frame is substantially equal to the vertical dimension of a magazine aperture 78a, 78b, 80a or 80b. As previously stated, the member 126 is cut out as at 130 so that no intervening portion thereof interferes with the transmission of light through the optically registered apertures. The location and dimensions of the frames relative to the transport aperture 114, and consequently of the transport pawl 128, are such that these components are out of the "window" through which light is transmitted. As best seen in FIGURES 3 and 4, the pawl 128 projects forwardly at the center of the aperture 80 far enough to enter the film planes so that the pawl projects into the aperture registered therewith, which is accomplished when the film is loaded in the magazine. That is to say, the leader portion 110, for example, is fed through the film track until a portion thereof rolls up in one of the associated cavities and one of the transport apertures 114 registers or near registers with the notch 144 at one side of the aperture 80. It will be understood, of course, that similar notches or cut outs are provided for the aperture 78. As shown in FIGURE 8, the transport apertures 114 may extend beyond the frames 116 and 118 so that the buttons 36 and 38 may be preliminarily actuated to secure proper register of the pawl with the transport apertures without exposing any frames at the light-transmitting apertures.

Another significant aspect of the invention is the design and construction of the magazine 26, which is here made up of two identical halves A and B which are assembled at a common horizontal parting plane. When assembled, the two halves complete the body portions, walls and cavities previously described. Thus, each half includes components of the parts already described. For example, the half A includes the lower aperture portions 78a and 80a, as well as the dowel-receiving portions 86a and 88a, previously described. Similarly, the part A includes the lower half of the mounting opening 68, here 68a, and the half B includes the other opening half 68b. The half A includes the cavity portions 100a, 102a, 106a and 108a, as well as film track portions 94a and 96a. The complementary portions appear in the half B at 100b, 102b, 106b, 108b, 94b and 96b.

Now, looking at FIGURES 9 and 10 as a composite figure and in conjunction with FIGURE 11, it will be seen that, if two halves A and B are regarded as "hinged" along cooperating edges of their complementary walls 70a and 70b, half B, when turned through 180° will lie on top of half A, but will of course be inverted, so that the cavity portions 108a and 108b, for example, will cooperate to form the cavity 108. Likewise, the same relationship will occur among 106a and 106b, 100a and 100b, and 102a and 102b etc. In its assembled condition, the magazine is held together by any suitable securing means, here represented by a pair of oppositely directed screws 156, the halves A and B being identically drilled and tapped but because of the reversal inherent in turning the halves before assembling them, the drilled hole in one half will line up with the tapped bore in the other half. This will be clear from an examination of FIGURES 9 and 10 in which it will be seen that the half A has a tapped hole 156a and a drilled hole 158a, whereas the half B has its drilled hole at 156b and its tapped hole at 158b. This is merely representative of several forms of means whereby the two halves A and B may be secured together to provide the finished magazine. The ends of the cavities opposite to the common parting plane are closed, of course, to confine the films 98 and 104. Hence, the only effective openings in the completed magazine are those at 78 and 80 and the mounting opening 68.

In the use of the magazine, the two halves are separated so that the films 98 and 104 can be loaded therein. In a case in which the magazine is not equipped with the film control means, to be described later, both films may be installed in one half, the major portion thereof being rolled up in one cavity, as at 106a, and the other portion threaded through the film track portion 96a and a take-up roll started in the other cavity 108a, which is possible because of the extended leader portion 110. The other film is similarly installed in the other set of portions 94a, 100a and 102a. The other half is now assembled and the two separate films are confined to their separate group of film-handling portions. For the purpose of convenience in usage, the magazine is numbered on the front by the numerals 1 and 2 and on the rear by the numerals 3 and 4 (FIGURES 1 and 2). When the numeral 1 is to the front and is right side up, as shown in FIGURES 1 and 2, it means that the viewer is looking at the program contained in the lower row of frames in the rear film 98. In this case, the film is unrolling from the cavity 106 into the cavity 108 as it passes the aperture 80 in the film track 96. Of course, the program on the unviewable row of frames 116 is reversely sequenced, because as the program on the frames 118 is being unrolled from the cavity 106 to the cavity 108, just the reverse is happening to the program on the upper frames 116. Consequently, when the program on the lower row of frames is completed, the magazine is removed from the mount 24 and is rotated 180° about a fore-and-aft axis through the centers of the fore-and-aft alined apertures 78 and 80. This places the previously upper row of frames 116 at the bottom. At the same time, the inverted numeral 2 at the left-hand side of the magazine (FIGURES 1 and 2) now becomes right side up, indicating to the user that program number two is ready to be viewed. The cavity 108 will now be at the right-hand side of the machine, containing the maximum portion of the film 104 so that as the film is unrolled to the cavity 106a now at the left-hand side of the machine, the program will be properly sequenced according to the now lower row of frames 116.

Rolling and unrolling of the film 104 to view the two programs respectively thereon has no effect on the film in the forward cavities 100 and 102. When it is desired to view program three, the magazine is turned about its major vertical axis so that the numeral 3 appears at the front and in its right-side-up position. As will be apparent from FIGURES 9 and 10 when regarded as preliminary to the assembly of the magazine, it will be seen that when the half B is placed on top of the half A, the numeral 1 will be at the lower right-hand corner, the numeral 2 will be at the upper left-hand corner but inverted, the numeral 3 will be at the rear upper left-hand corner, right-side-up, and the numeral 4 will be at the lower right-hand rear corner but upside down. As in the case of the designating numerals 1 and 2, the programs on the film 98 are identified by the numerals 3 and 4. Thus, as program three is being shown and is unrolled from one cavity to the other, the reversely sequenced program number four will be unrolled from one cavity and re-rolled in the other but in reverse order so that when the magazine is inverted and program four is run it will be properly projectible on the screen 28.

In FIGURE 11, the numerals 1, 2, 3 and 4 are shown generally as to position and condition, and it will be seen that numerals 1 and 2 are right-side-up and numerals 3 and 4 are upside down, but when the two halves are assembled, the numeral 2 will be upside down, the numeral 4 will remain upside down, the numeral 1 will remain right-side-up and the numeral 3 will become right-side-up.

FIGURE 13 illustrates one of the cavities as being equipped with film control means. For the purposes of explanation, the cavity 108a has been chosen; although, as will appear, the same situation exists in the cavity 102b and reversed but symmetrical situations exist in cavities 106a and 100b.

The purpose of the film control means is to radially confine the film to a relatively small roll so that it does not engage the interior cylindrical surface of the cavity 108a, which normally creates sufficient friction to interfere with proper transport of the film. In the example shown, the film 104 is being fed into the cavity 108a so that its end portion 110 begins to roll up in a counter-clockwise direction. Without the intervention of the film control means, here represented by a pair of arcuate spring wires 160, the leader portion 110 would follow the interior surface of the cavity, because of the natural tendency of the film to unroll. However, with the control wires 160, this tendency is overcome and the roll starts with a small diameter and ultimately increases.

Each control wire is preferably formed of a single piece of metallic wire having its upper portion in the form of an arm as shown, one end of which is rolled at 162 to form an eye and the other end of which is coiled into a coil spring 164 on a vertical axis and receivable in a slot 166, there being two such vertically directed slots substantially 90° apart in the cavity 108a (FIGURE 10). The lower end of each coil spring 164 terminates as a generally circumferentially extending leg 168 which abuts the interior surface portions of the cavity adjacent to the slots 166 so as to bias the crossed wires 160 substantially to the position shown in FIGURE 13; that is, a position in which they have an initial confining action on the leader portion 110 of the film 104. As film is fed into the cavity 108 between the confines established by the two wires 160, the diameter of the rolled portion of course increases, and the springs 160 yield outwardly, the one arm yielding to the left and the other arm simultaneously moving upwardly. The surface portion of the half A bordering the cavity 108a is recessed to accommodate the eyes 162 of the arms, as at 170. Hence, when the two halves A and B are assembled, the portion of the half B which has no recesses lies over the portion having the recesses 170, but these recesses are preferably substantially twice the thickness of a wire so as to easily accommodate the two wires without interference with free movement thereof. As the film moves in the opposite direction to unroll, the wires gradually close or return to the position of FIGURE 13.

The cavity 106a is reversed to and symmetrical with the cavity 108a so far as concerns the film control means and, although no wires have been shown in the cavity 106a, the presence of the slots, as at 172 and the arcuate recesses at 174, illustrate that similar control wires are used in that cavity. The same situation exists as respects the cavities 100b and 102b, the former having coil-spring-receiving slots 176 and recesses 178 and the latter having slots 180 and recesses 182. The symmetrical pattern is carried out so that one cavity half having recesses meets with a complementary cavity half having no recesses. Of course, the construction could be other than as illustrated but that shown adequately accommodates movement of the control wires. Broadly, any other form of control means could be utilized in the cavity.

Loading of film in the magazine equipped with the control wires 160 will follow a different pattern, since one film must be loaded in each half A, B. That is, and looking at FIGURES 9 and 10, and assuming that control wires are assembled in cavities 106a, 108a, 100b and 102b, one film is loaded in half A and the other film in half B. This is required because the control wires in the cavities respectively receiving the larger rolled portions of the film must be manually spread to enable insertion of the rolls, after which the leader portions are manually fed through their respective film track halves and take-up rolls manually started in the respective take-up cavity halves. There will then be enough pressure on the rolls to hold the films as the half B is inverted and placed on top of half A and the screws 156 installed. In this procedure, the cavity halves without the control wires will of course mate respectively with those having control wires.

Acceptable rolling of the film into and out of the cavities is effected by forming the ends of the film in tubular form, which is easily achieved by curving each end portion back upon itself and cementing same as at 184 (FIGURE 13).

From the foregoing, it will be seen that a novel arrangement of components has been provided, featuring the multi-positionable magazine, the structure whereby the same may be mounted, dismounted, inverted and reversed, all in association with film transport and handling means assuring proper viewing or running of selected programs. It is a feature of the magazine that the films are self contained; that is, they have no external portions looped or otherwise wound outside the magazine. The magazine, once assembled, is substantially fool proof and can be readily changed even by the youngest user or student. The housing of part of the optical system within the mount 24 makes the structure unusually compact. The film itself is convenient to use and process by virtue of the provision of the central row of transport elements or apertures, while retaining the processing apertures at the opposite longitudinal edges.

A significant feature of the mounting and dismounting of the magazine is its association with the transport mechanism. Inasmuch as the magazine must be installed by a downward and then rearward movement, and must be removed by a forward and then upward movement, it is assured that the pawl 128 is properly engaged and disengaged with and from the film. It is more significant that control be accomplished during removal of the magazine, since otherwise a straight upward movement of the magazine while the pawl is engaged with a transport aperture could result in tearing of the film. During installation, even though the aperture and pawl be not registered, movement of the magazine rearwardly means only that the film will yield until it is advanced or retracted to register its aperture with the pawl. In such case, damage will not result.

Since the magazine is capable of holding the films in a substantially confined position, magazines may be used and stored in series, particularly since no portions of the film are exposed except at the viewing apertures 78 and 80.

Features and advantages other than those already enumerated will readily occur to those versed in the art, as will many modifications and alterations in the preferred embodiment disclosed, all of which may be achieved without departure from the spirit and scope of the invention.

What is claimed is:

1. Projection apparatus, comprising: support structure including an upright, hollow mounting element having front and rear and opposite side walls, two of said walls being parallel and said rear wall having an aperture therein; an optical system on said structure, including a part externally of and a part within said element, for transmitting light through said aperture; a film magazine having interior upright walls defining an opening therein dimensioned and shaped to receive said element, an opposed pair of said magazine walls being parallel and spaced apart on the order of and cooperative with the aforesaid parallel walls of the element to locate the magazine on the element and to provide for slidable downward mounting of said magazine on slidable and upward removal thereof from said element, said magazine when mounted having a rear part closely behind the element rear wall and first and second side parts respectively at opposite sides of the element, said rear part having an aperture therein registrable with the aforesaid aperture on a fore-and-aft axis, said first side part having a cavity adapted to hold a roll of film, said rear part having a film track for carrying the film past said apertures as it unrolls from the first cavity, and said second side part having a similar cavity to receive such film from the track and to cause it to roll up, said magazine being symmetrical about a fore-and-aft axis so as to be removable upwardly from the element for inversion from side to side and for remounting on the element with the rear part behind the element and the first and second side parts reversed as to the sides of the element; and means on the support structure and engageable with the film to transport the film from one cavity to the other via the film track in either position of the magazine.

2. The invention defined in claim 1, in which: the magazine further includes a front part and third and fourth side parts respectively similar to said rear and first and second side parts and symmetrical with the latter parts about a transverse axis through the center of the element so that said magazine when removed from the element is reversible front to rear for remounting thereof on the element with the front and third and fourth side parts respectively interchanged with the rear and first and second side parts, said front part having a film track and aperture therein similar to those of the rear part and said third and fourth side parts respectively having cavities therein similar to those of the first and second side parts to accommodate a second film.

3. The invention defined in claim 1, in which: each cavity is defined by upright wall means generally annular about an upright axis and each wall means carries a resilient arm projecting therefrom toward said axis for guiding the rolling and unrolling of the film.

4. The invention defined in claim 1, in which: the side walls of the elements are the parallel walls; the film transport means includes a member projecting forwardly for engagement with the film, the opening in the magazine has a longer fore-and-aft dimension than the element to enable downward mounting of the magazine forwardly clear of said member and for subsequent rearward shifting to engage the film with said member and for forward shifting of the magazine to disengage the film and member prior to upward removal of said magazine, and said parallel element and magazine walls serving as guide means cooperative between the element and the magazine to compel movement of the magazine as aforesaid incident to mounting and removal thereof.

5. The invention defined in claim 4, including means operative between the magazine and element for biasing the magazine rearwardly when mounted.

6. The invention defined in claim 1, in which: the element has an open bottom; the supporting structure includes a viewing screen offset from the element; and said optical system including means for reflecting the light from the element to the screen, including a reflector within the element.

7. Projection apparatus, comprising: a projection light source; support structure including an upright, hollow mounting element having front and rear and opposite side walls and said rear wall having an aperture therein, said element being spaced forwardly of said light source with said aperture in alinement with said source; an optical system supported in said element comprising an objective lens having its optical axis alined with said rear wall aperture and a mirror positioned to reflect the projected image-carrying beam from the lens onto a second mirror mounted in said support structure for reflection therefrom to a projection screen mounted in the front of said structure; a film magazine having an opening therein dimensioned and shaped to receive said element for downward mounting of said magazine on and upward removal thereof from said element, said magazine when mounted having a rear part closely behind the element rear wall and first and second side parts respectively at opposite sides of the element, said rear part having an aperture therein registrable with the aforesaid aperture on a fore-and-aft axis, said first side part having a cavity adapted to hold a roll of film, said rear part having a film track for carrying the film pasts aid apertures as it unrolls from the first cavity, and said second side part having a similar cavity to receive such film from the track and to cause it to roll up, said magazine being symmetrical about a fore-and-aft axis so as to be removable upwardly from the element for inversion from side to side and for remounting on the element with the rear part behind the element and the first and second side parts reversed as to the sides of the element; and means on the support structure and engageable with the film to transport the film from one cavity to the other via the film track in either position of the magazine.

8. The invention defined in claim 7, including: locating means cooperative between the magazine and element for assuring accurate mounting of the magazine on the element.

9. Projection apparatus, comprising: support structure including an upright, box-like, non-circular hollow mounting element having a rear wall portion provided with an aperture therein; an optical system on said structure, including a part externally of and a part within said element, for transmitting light through said aperture; a film magazine having a non-circular vertical opening therein dimensioned and shaped to closely receive said element for slidable downward mounting of said magazine on and slidable upward removal thereof from said element, said magazine when mounted having a rear part closely behind the element rear wall portion and first and second side parts respectively at opposite sides of the element, said rear part having an aperture therein registrable with the aforesaid aperture on a fore-and-aft axis, said first side part having a cavity adapted to hold a roll of film, said rear part having a film track for carrying the film past said apertures as it unrolls from the first cavity, and said second side part having a similar cavity to receive such film from the track and to cause it to roll up, said magazine being symmetrical about a fore-and-aft axis so as to be removable upwardly from the element for inversion from side to side and for remounting on the element with the rear part behind the element and the first and second side parts reversed as to the sides of the element; and means on the support structure and engageable with the film to transport the film from one cavity to the other via the film track in either position of the magazine.

10. A film magazine for projection apparatus of the class described, comprising: a main body including upper and lower faces, a central pocket opening vertically at one of said faces, and a plurality of body portions surrounding said pocket, said portions being arranged as first and second sets for respectively handling first and second separate films, each set including an upright wall having a film track therein and a pair of film-handling cavities respectively leading to oppoiste ends of said track, each wall having an aperture therethrough opening to said pocket and each cavity being shaped and dimensioned to handle rolled film so that as film is unrolled from one cavity and transported via the film track it is re-rolled in the other cavity of the same set, said sets being symmetrical about an upright axis centrally through the pocket.

11. A film magazine for projection apparatus of the class described, comprising: a main body including upper and lower faces, a central pocket opening vertically at both of said faces, and a plurality of body portions surrounding said pocket, said portions being arranged as first and second sets for respectively handling first and second separate films, each set including an upright wall having a film track therein and a pair of film-handling cavities respectively leading to opposite ends of said track, each wall having an aperture therethrough opening to said pocket on a horizontal axis and each cavity being shaped and dimensioned to handle rolled film so that as film is unrolled from one cavity and transported via the film track it is re-rolled in the other cavity of the same set, said sets being symmetrical about an upright axis centrally through the pocket and further being symmetrical about the aforesaid horizontal axis.

12. The invention defined in claim 11, in which: the main body comprises upper and lower halves symmetrical at opposite sides of a horizontal median plane midway between said upper and lower faces, each half having parts cooperative with similar and matching parts in the other half to establish said pocket, said body portions, said upright walls and film tracks and said cavities and apertures, said halves being separable at said median plane for the loading and unloading of film, and said body having releasable securing means normally securing said halves together.

13. The invention defined in claim 11, in which: each cavity includes means acting on its respective rolled film for guiding the rolling and unrolling of the film.

14. The invention defined in claim 11, in which: each cavity is of generally circular section about an upright axis and includes a curved portion having a tangent junction with its associated film track so as to cause the film to readily roll up as it enters said cavity from said track.

15. A film magazine for projection apparatus of the class described, comprising: a main body of generally rectangular shape including upper and lower faces, a central pocket opening vertically at both of said faces, and a plurality of body portions surrounding said pocket, said portions being arranged as front and rear sets for respectively handling front and rear separate films, each set including an upright wall having a film track therein and a pair of film-handling cavities respectively leading to opposite ends of said track, said walls being parallel and each wall having an aperture therethrough opening to said pocket on a horizontal fore-and-aft axis and each cavity bieng shaped and dimensioned to handle rolled film so that as film is unrolled from one cavity and transported via the film track it is re-rolled in the other cavity of the same set, said sets being symmetrical about an upright axis centrally through the pocket and further being nymmetrical about the aforesaid horizontal fore-and-aft axis.

16. A film magazine for projection apparatus of the class described, comprising: a main body including a transverse wall portion having a film track therein and an aperture therethrough to expose the film, said body further having first and second side portions respectively at opposite ends of said transverse portion, said first side portion having wall means defining a first cavity therein leading to said track and adapted to surround and to freely contain a roll of film and said second side portion having wall means defining a second cavity therein in communicatioin with the track for receiving film therefrom as such film is transported across the track, said side portions projecting generally normal to said wall portion and being spaced apart lengthwise of said wall portion to define therewith a mounting pocket for mounting the magazine on a projection apparatus; and means in each cavity including a resilient arm carried by the respective wall means and projecting inwardly therefrom for acting yieldably radially inwardly on the film roll therein.

References Cited by the Examiner
UNITED STATES PATENTS

| | | | |
|---|---|---|---|
| 1,073,411 | 9/1913 | Ullman | 352—240 |
| 1,267,411 | 5/1918 | Howell | 352—239 |
| 1,801,061 | 4/1931 | Thornton | 352—125 |
| 2,080,086 | 5/1937 | Mihalyi | 352—73 |
| 2,123,495 | 7/1938 | Becker | 352—78 |
| 2,174,660 | 10/1939 | Firsch | 88—28 |
| 2,231,743 | 2/1941 | Young | 88—28 |
| 2,624,231 | 7/1948 | Kingston | 352—83 |

JULIA E. COINER, *Primary Examiner.*

EMIL G. ANDERSON, *Examiner.*